United States Patent
Andrews

(10) Patent No.: US 6,802,052 B1
(45) Date of Patent: Oct. 5, 2004

(54) METHOD, APPARATUS, AND ARTICLE OF MANUFACTURE FOR PROVIDING AUTOMATIC RECOGNITION AND PLAYBACK OF REPETITIVE INPUT DEVICE PATTERNS

(75) Inventor: Gregory Paul Andrews, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 09/614,397

(22) Filed: Jul. 13, 2000

(51) Int. Cl.[7] .............................................. G06F 9/44
(52) U.S. Cl. ..................................... 717/100; 717/106
(58) Field of Search .............................. 717/100–103, 717/106–109, 114–119

(56) References Cited

U.S. PATENT DOCUMENTS

| | | | | |
|---|---|---|---|---|
| 5,309,354 A | * | 5/1994 | Dick ........................... | 700/57 |
| 5,566,336 A | * | 10/1996 | Futatsugi et al. ........... | 717/109 |
| 5,767,853 A | * | 6/1998 | Yoshida et al. ............. | 345/839 |
| 5,872,797 A | * | 2/1999 | Theodoseau ................ | 714/738 |
| 6,263,493 B1 | * | 7/2001 | Ehrman ...................... | 717/114 |
| 6,336,149 B1 | * | 1/2002 | Preston ......................... | 710/1 |
| 6,425,124 B1 | * | 7/2002 | Tominaga et al. .......... | 717/146 |
| 6,690,392 B1 | * | 2/2004 | Wugoski ..................... | 345/744 |

* cited by examiner

*Primary Examiner*—Wei Zhen
(74) *Attorney, Agent, or Firm*—Moser, Patterson & Sheridan, LLP

(57) ABSTRACT

An apparatus, method, and article of manufacture for providing automatic recognition and playback of repetitive input device patterns. The invention provides an apparatus for automatic recognition and playback of repetitive input device patterns in a computer system comprising an interconnect, a processor coupled to the interconnect, and memory coupled to the interconnect and containing one or more application programs. An input device is coupled to the interconnect and configured to generate input device events during a session with one of the one or more application programs. Moreover, an auto-macro program is stored in the memory, wherein the auto-macro program, when executed by the processor, detects repetitive input device patterns in the input device events and generates a macro for each of the repetitive input device patterns.

19 Claims, 4 Drawing Sheets

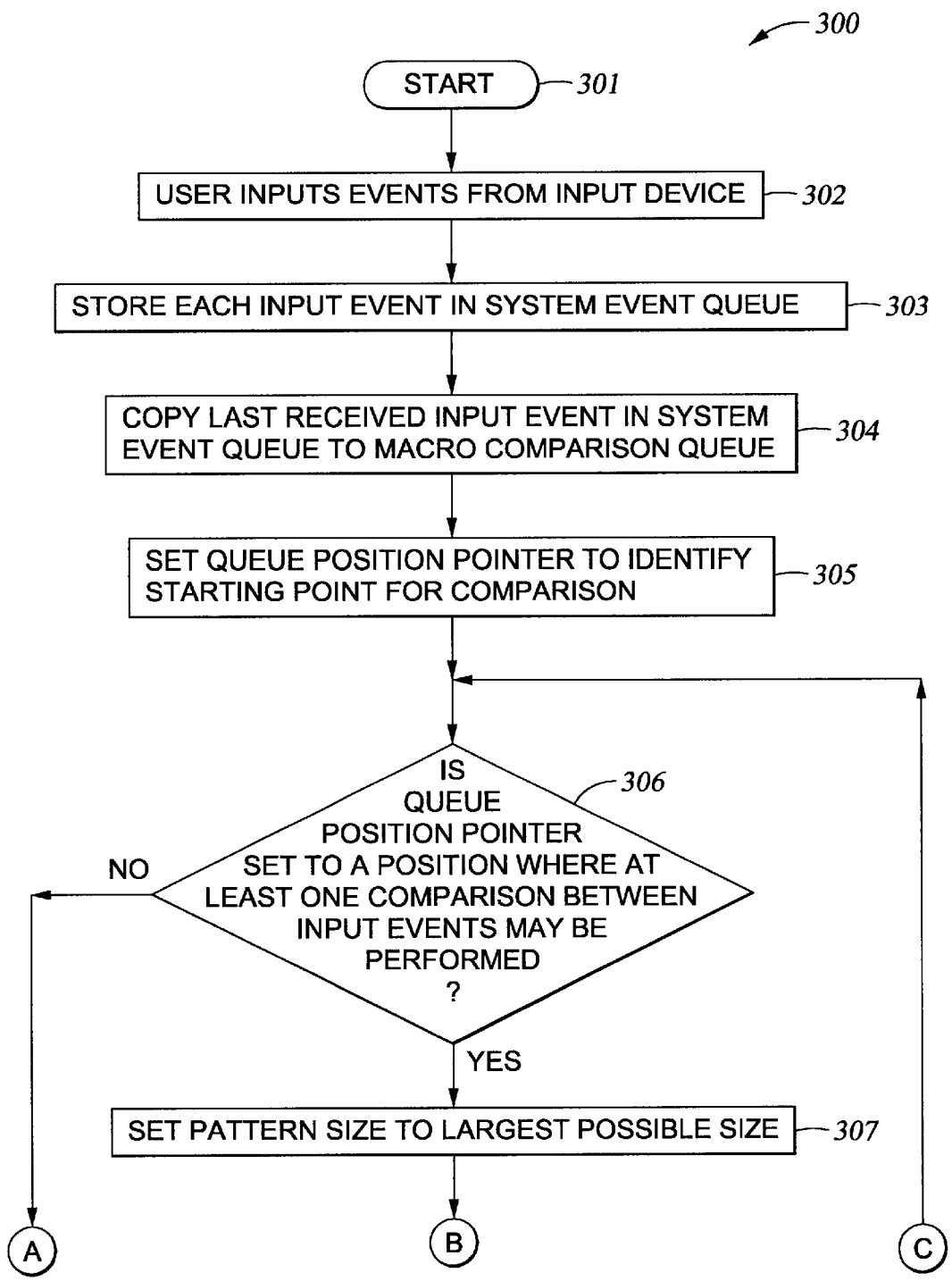

METHOD, APPARATUS, AND ARTICLE OF MANUFACTURE FOR PROVIDING AUTOMATIC RECOGNITION AND PLAYBACK OF REPETITIVE INPUT DEVICE PATTERNS

BACKGROUND OF THE INVENTION

1. Field of the Invention

The invention relates information processing. More particularly, the invention relates to a method, apparatus, and article of manufacture for generating machine routines (macros) in a computer system.

2. Background of the Related Art

Machine routines (macros) are utilized in computer system software to set up shortcuts for inputting repetitive patterns from an input device. If a user knows in advance that he or she will be inputting information (illustratively, a string of numbers into a spreadsheet application program every so often), then the user may beforehand, set up a simple string or combination of characters to input the larger string of numbers. For example, the numeral 83,493.36 is a numeric string that is 9 characters long. In this instance, the user may define a macro to input this 9-character number by simultaneously pressing an ALT and a "N" key on a keyboard. In each instance that a user simultaneously presses the ALT and N keys on a keyboard, the number 83,493.36 is inserted into a working document. Macros may be used in any application software such as word processing, graphic presentation programs, computer-aided design, and the like.

One problem with macros is the need to know in advance the repetitive patterns that are going to be inputted into an application. However, there may be instances where the user is not aware of repetitive patterns of information until the user is in the process of inputting such information. In such instances, the user unnecessarily enters redundant data, which results in diminished productivity.

Therefore, there is a need for a user to be able to invoke the use of a macro that overcomes deficiencies of prior art.

SUMMARY OF THE INVENTION

The present invention provides an apparatus, method, and article of manufacture for providing automatic recognition and playback of repetitive input device patterns. In one aspect of the invention, an apparatus for automatic recognition and playback of repetitive input device patterns in a computer system comprising an interconnect, a processor coupled to the interconnect, and memory coupled to the interconnect and containing one or more application programs. An input device is coupled to the interconnect and configured to generate input device events during a session with one of the one or more application programs. Moreover, an auto-macro program is stored in the memory, wherein the auto-macro program, when executed by the processor, detects repetitive input device patterns in the input device events and generates a macro for each of the repetitive input device patterns.

In a second aspect of the invention, a method for automatic recognition and playback of repetitive input device patterns in a computer system comprises receiving a plurality of input device events during an application program session. The method then determines whether one or more of the plurality of input device events exhibit one or more patterns, and if so, generates one or more macros for using the repetitive input device patterns.

Yet, in another aspect of the invention, a computer-readable medium having instructions or programs which, when executed by a processor, causes the processor to perform a method for automatic recognition and playback of repetitive input device patterns in a computer system comprises receiving a plurality of input device events during an application program session. The method then determines whether one or more of the plurality of input device events exhibit one or more patterns, and if so, generates one or more macros for using the repetitive input device patterns.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention relates to a method, article of manufacture, and apparatus for automatically generating machine routines (macros) in a computer system based upon repetitive patterns. Specifically, the invention utilizes an auto-macro program comprising a queuing system that operates with a computer system's operating system and application programs to search for repetitive patterns as a user inputs data into an applications program.

As described in detail herein, aspects of the preferred embodiment pertain to specific method steps implementable on computer systems. In an alternative embodiment, the invention may be implemented as a computer software product for use with a computer system. The programs of the software product define the functions of the preferred embodiment and may be delivered to a computer via a variety of signal-bearing media, which include, but are not limited to, (a) information permanently stored on non-writable storage media (e.g., read-only memory devices within a computer such as CD-ROM disks readable by CD-ROM drive); (b) alterable information stored on writable storage media (e.g., floppy disks within diskette drive or hard-disk drive 114); or (c) information conveyed to a computer by a communications medium, such as through a computer or telephone network, including wireless communications. Such signal-bearing media, when carrying computer-readable instructions that direct the functions of the present invention, represent alternative embodiments of the present invention.

Figure 1:
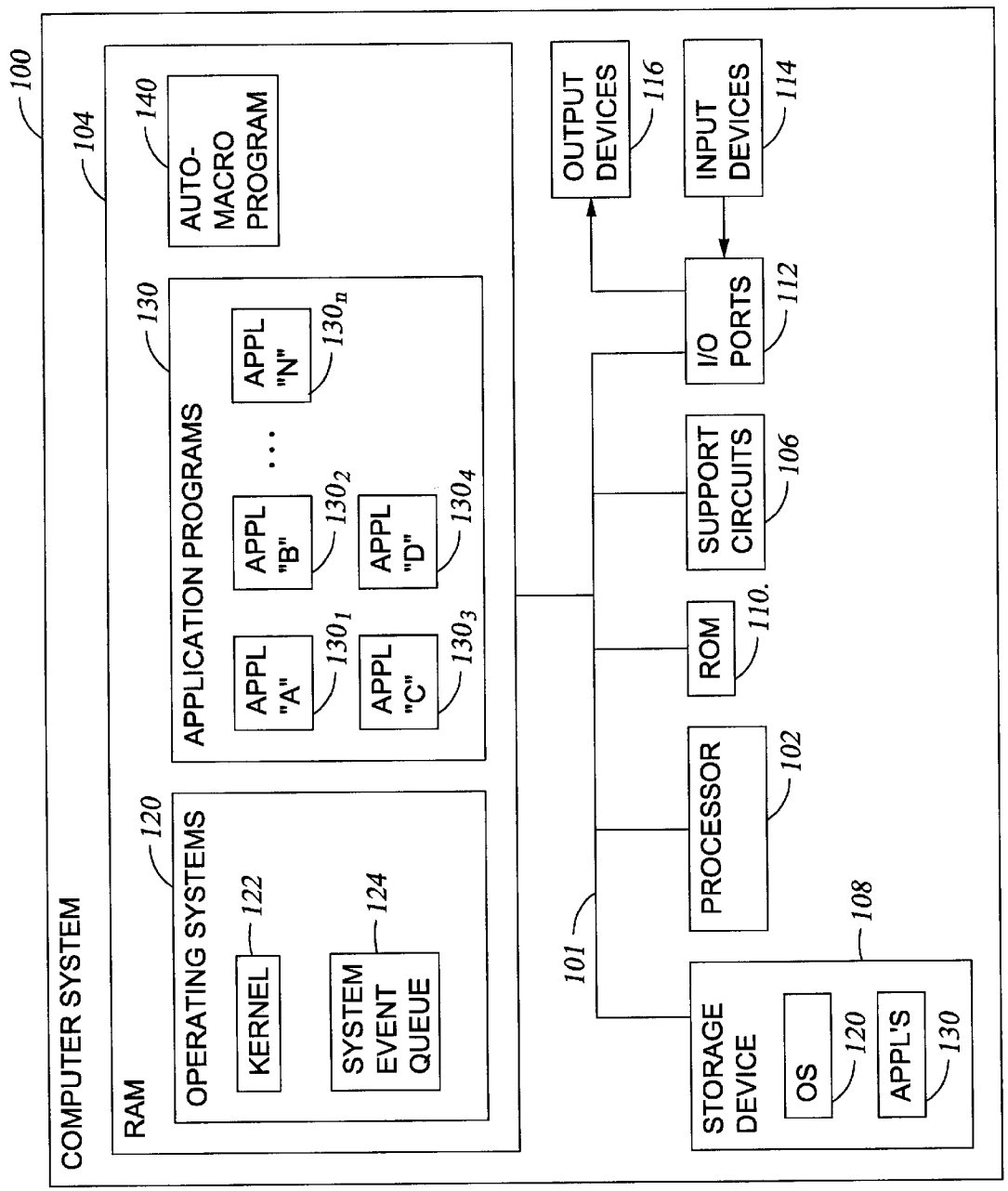
FIG. 1 depicts a block diagram of a computer system in accordance with the present invention.

FIG. 1 depicts a computer system 100 in accordance with the present invention. In one embodiment of the invention, the computer system 100 may be a desktop computer, however a person skilled in the art will recognize that a laptop computer, server, hand-held device, or the like may alternately be utilized. The computer 100 comprises at least one system interconnect, e.g., bus 101 to which various components are coupled and communicate with each other. Specifically, a processor 102, storage device 108, memory such as random access memory (RAM) 104, read only memory (ROM) 110, input/output (I/O) ports 112, and other support circuits 106 are coupled to the system bus 101. Furthermore, one or more output devices 116, such as a display, as well as one or more input devices 114 such as a keyboard and/or pointing device are respectively coupled to the I/O ports 112. The input and output devices 114 and 116 permit user interaction with the compute system 100.

The processor 102 sends and receives information to and from each of the computer components coupled to the system bus 101 and performs system operations based upon the requirements of the computer system's operating system 120 and application programs 130 that are installed thereon. The processor 102 may be an INTEL PENTIUM® type microprocessor or the like.

The ROM 110 typically includes a Basic Input-Output System (BIOS) program, which controls basic hardware operations such as the interaction of the microprocessor 102 with the keyboard/mouse input device 114, hard disk 108, or video display 116, and the like. The storage device 108 is a permanent storage medium such as a hard disk, CD-ROM, tape, or the like, which stores the operating system 120 and applications program files 130.

The RAM 104 is volatile memory (e.g., SRAM, DRAM and the like). The contents of the RAM 104 may be retrieved from the storage device 108 as required. Illustratively, the RAM 104 is shown with application programs 130 "A" through "N" concurrently. The program code is sent to the RAM 104 for temporary storage and subsequent execution by the processor 102.

The I/O port 112 includes various controllers (not shown) for each input device 114 such as a keyboard, mouse, joystick, and the like, as well as the output devices 116 such as an Ethernet network adapter, infrared device (not shown) and display 116. Typically, other support circuits 106 include controllers for the storage device 108, floppy drive, graphics display, and the like (not shown).

The operating system (OS) 120 may be IBM's OS/2 WARP 4.0® system, any one of Microsoft's WINDOWS® operating systems, or any other operating system 120 that provides graphical user interfaces (GUI) for user interaction. The operating system 120 is capable of interfacing with all of the hardware components of the computer 100. The applications programs 130 are specialized programs such as a word processing programs, spreadsheets, web browsers, and the like. The executable and library files (not shown) of the operating system 120 and application programs 130 are individually transferred from the storage device 108 to the RAM 104 for processing as needed. The transfer of the executable files may be controlled by a memory management system such as on-demand paging. A page is a fixed amount of data that is sent to the RAM 104 for subsequent execution by the microprocessor 102. The RAM 104 may simultaneously store a plurality of pages of data to accommodate various files being processed by the operating system 120 and application programs 130 that are concurrently running. Thus, the RAM 104 is capable of storing files from the operating system 120, as well as files from one or more applications programs $130_1$ through $130_n$ (collectively applications programs 130).

In order to oversee the execution of all the files opened, a kernel 122 is stored in the RAM 104. The kernel is a central module of the operating system that is initially loaded into the RAM 104. The kernel 122 is installed at dedicated addresses in the RAM 104 and is responsible for memory management, process and task management, and disk management. The kernel 122 manages one or more files that are open during the course of operation.

The RAM 104 further comprises a portion of memory for a system event queue 124 and an auto-macro program 140. The system event queue 124 is utilized as a buffer for storing a sequence of input events. An input event is, illustratively, one or more strokes of a keyboard character, a coordinate signal for movement of a pointing device, a voice command, or any other user-generated input to the computer system 100. The auto-macro program 140 is utilized to compare patterns within a sequence of the input events for generating a macro to selectively repeat such pattern as subsequent input events at the command of the user. A pattern between a sequence of input events may be exactly the same such as pressing the keys "TAB" and "G" three times in a row, or may comprise repetitive portions and/or other patterns within the sequence such as "10" "TAB" and "A", "20" "TAB" and "B", "30" "TAB" and "C", and so forth.

Figure 2:
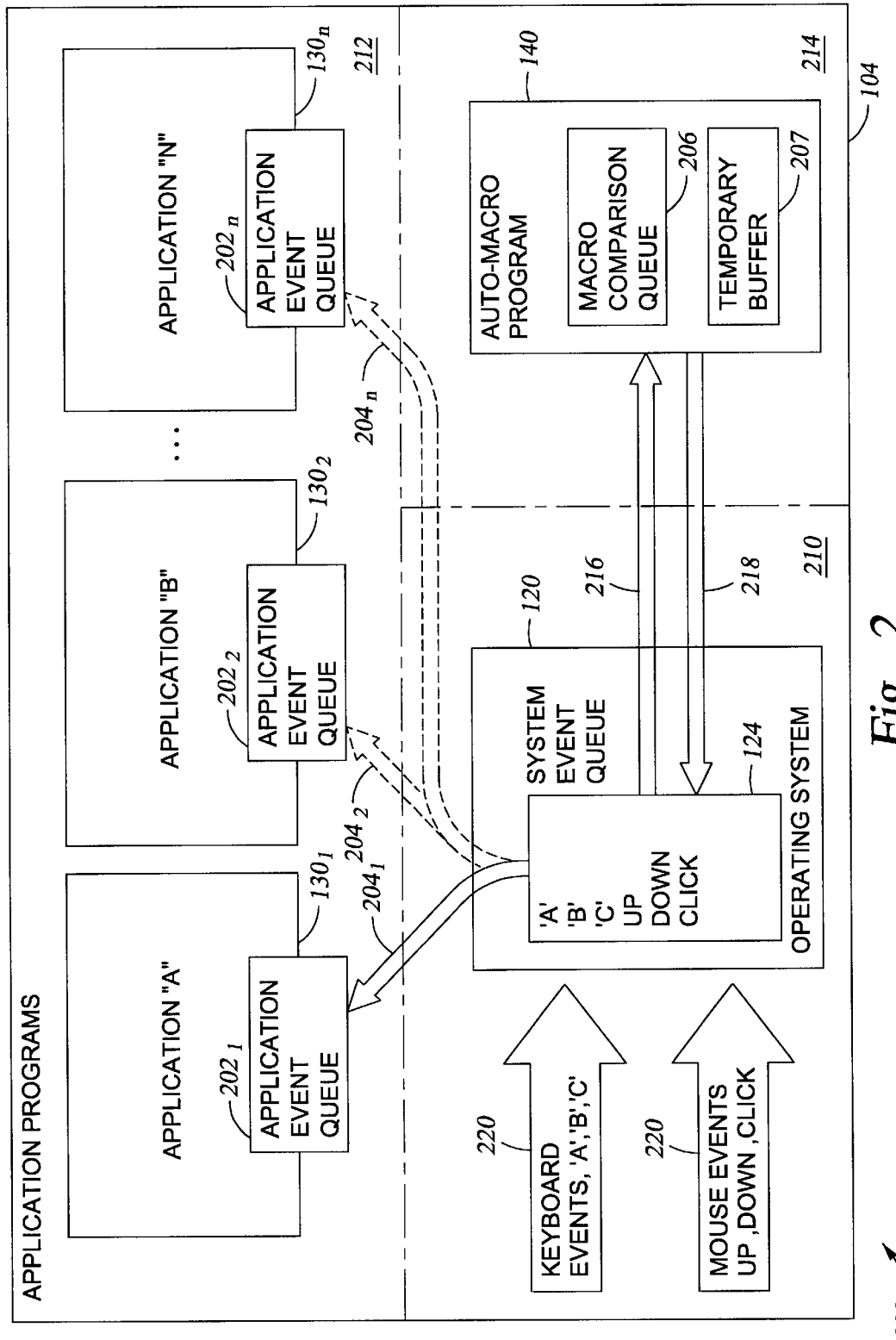
FIG. 2 depicts a detailed block diagram further depicting the present invention in the RAM in FIG. 1.

FIG. 2 depicts a detailed block diagram 200 further depicting the present invention in the RAM 104 in FIG. 1. In particular, the RAM 104 comprises a first memory portion 210 for storing the operating system 120 and a second memory portion 212 for storing the application programs $130_1$ through $130_n$. When a user selectively initiates the auto-macro program 140, the auto-macro program 140 is loaded into a third memory portion 214 of the RAM 104 to operate in conjunction with a selected application program 130.

A user begins using the selected application program 130 by generating a sequence of input device events 220. Illustratively, the input device events 220 shown in FIG. 2 include keyboard events and mouse events. More generally however, the input device events 220 includes any pointing device, a light pen, a voice command, and the like. The input device events 220 are sequentially stored in the system event queue 124 residing in the operating system 120. Thus, the system event queue 124 comprises sequences of input event information.

In one embodiment, the auto-macro program 140 comprises a macro comparison queue 206 and a temporary buffer 207. Each time an input device event is received by the system event queue 124, the auto-macro program copies the respective input device event to the macro comparison queue 206 via path 216. The macro comparison queue 206 may be configured to store any number of input device events 220. The capacity of the macro comparison queue 206 is referred to herein as the "macro comparison queue size." In one embodiment, the macro comparison queue size is 16 input device events. Furthermore, the input device events are stored and saved by a first in first out (FIFO) management technique. Thus, upon entering the $17^{th}$ input device event, the first input device event in the sequence is discarded from the macro comparison queue 206.

The auto-macro program 140 utilizes the macro comparison queue 206 to make comparisons between two or more input device event sequences to identify repetitive or similar patterns. Once a pattern has been identified, the identified input event pattern is stored in the temporary buffer 207, and a macro shortcut is generated by the auto-macro program 140. The macro shortcut corresponds to the type of repetitive pattern that was detected. For example, if the identified repetitive pattern is a series of keystrokes on a keyboard, the auto-macro program 140 assigns some combination of keyboard characters to implement the macro shortcut. Alternately, if the repetitive pattern is a series of movements by a pointing device, a button on the pointing device may, illustratively, be utilized to implement the macro shortcut. Other macro shortcuts may include, but are not limited to, a voice command, infrared light signals, and the like. Furthermore, a plurality of macro shortcuts may be generated by the auto-macro program 140. In particular, the auto-macro program 140 assigns a dedicated macro shortcut for each pattern that is detected and stored in the temporary buffer 207.

After the auto-macro program 140 detects an input device event pattern and the user assigns the macro shortcut, the auto-macro program 140 sends the input device event pattern to the system event queue 124 via path 218. Thereafter, the repetitive pattern is sent to the corresponding applications program 130 in the second memory portion 212 of the RAM 104 via an application/programming interface (API) 204. The API's 204 for transferring input device events 220 are represented by the arrows in FIG. 2. Generally, the operating system 120 comprises a plurality of application/programming interfaces (API) 204. Each application/programming interface 204 comprises program code that allows the operating system 120 to interact with an application program 130. Specifically, interactions between the operating system 120 and an application program 130 include performing various functions such as retrieving a next keyboard event, mouse event, display a dialog, providing access to memory, and the like.

Furthermore, the second memory portion 212 of the RAM 104 comprises at least one application event queue $202_1$ through $202_n$ (collectively application event queues 202), which corresponds with each application program $130_1$ through $130_n$. In one embodiment, each application event queue 202 comprises dedicated memory address space (not shown) for storing the input device event information sent via the API 204.

The system event queue 124 transfers the identified input device pattern to the application event queue 202 that corresponds with the application program session 130 that is currently active (e.g., application "A" $130_1$, in FIG. 2). The operating system 120 determines which application program session 130 is currently active. As illustrated in FIG. 2, the keyboard string "abc" is sent to the first application event queue $202_1$, which correspond with the application program session "A" $130_1$ via the API path shown by the arrow $204_1$. The other arrows drawn in phantom $204_2$ through $204_n$, which extend from the system event queue 124 to the application event queues $202_2$ and $202_3$, each represent API paths in the instances where the application program "B" $130_2$ through "n" $130_n$ is currently active by the user.

For example, a user may concurrently run a word processing session and a spreadsheet session, in which one session is active and the other session is inactive at any given time. If the macro shortcut was illustratively generated during the word processing session (Application "A" $130_1$ in FIG. 2), the user may subsequently implement the macro shortcut in the spreadsheet session (Application "B" $130_2$) by inactivating the word processing session and then activating the spreadsheet session. In this instance, the API $204_1$ would now appear in phantom, and the API $204_2$ would be accented in FIG. 2. As such, the macro shortcut may be utilized in any application program 130 that the user makes active and is capable of accepting such input device patterns.

FIG. 3 is represented by FIGS. 3A and B, which together depict a flow diagram of a method 300 to practice the present invention. It is suggested that FIG. 3 be viewed together with FIGS. 1 and 2. In general, the method 300 compares two or more input device events against other input device events stored in the macro comparison queue 206. In particular, the auto-macro program 140 creates one or more groups of input device events. Each group of input device events is selectively defined by a starting position in the queue 206 and a pattern size, such that each group in the macro comparison queue 206 has the same size pattern for comparison purposes. For instance, if the starting position is the second event in the queue and the pattern size is 3 events, then the queue 206 positions 2 through 4 comprise a first group of input device events. The first group of input device events are then compared to a second or more groups of input device events, defined at queue 206 positions 5 through 7, 8 through 10, and 11 through 13.

The method 300 begins in step 301 where a user selects and runs an application program session 130 (e.g., spreadsheet, word processing, and the like) in parallel with the operating system 120 and the auto-macro program 140. In step 302, during the course of the application program session, the user inputs various events from an input device such as the keyboard or mouse. In step 303, each input device event is stored in the operating system's system event queue 124 in the RAM 104. In step 304, the auto-macro program 140 transfers a copy of the last received input device event in the system event queue 124 to the macro comparison queue 206 via path 216 (see FIG. 2).

In step 305, a pointer in the macro comparison queue 206 is set by the auto-macro program 140 to identify a starting queue position "i" for performing input device event comparisons. In a preferred embodiment, the pointer is set to the first position in the macro comparison queue 206, where i=0. However, a person skilled in the art will recognize that the initial queue position may be set at any other position in the queue 206.

In step 306, the auto-macro program 140 performs a query to ensure that the pointer is not pointing to a position from which a comparison can not be performed. In particular, the auto-macro program 140 performs a query to ensure that the pointer is in a position such that at least one comparison may be performed as between input device events. In one embodiment, the pointer position must exceed the macro comparison queue size (QS) less a minimal pattern size (e.g., a smallest pattern (SP)), and is expressed as i<QS−SP. The smallest pattern size is selectively defined in the auto-macro program 140 as the minimal amount of input device events that are compared during method 300. In the embodiment discussed above, the macro comparison queue size (QS) is 16, i=0, and the smallest pattern size (SP) is two events. Other embodiments may include, but are not limited to, macro comparison queue sizes of QS=32 or 64, and the smallest pattern size may be set to SP=2, 3, or any other value that is less than or equal to half the macro comparison queue size QS. In absolute terms, the smallest pattern size is two events, since a comparison requires at least two events.

If the query in step 306 is answered negatively, then the method 300 proceeds to step 324 where the method 300 ends until a new input device event is loaded into the macro comparison queue 206, which restarts method 300. However, since the pointer in the embodiment is pointing at the first position (i=0) in the macro comparison queue 206, the result of the query in step 306 is answered affirmatively, i.e., 0<16−2 or 0<14.

The method 300 then proceeds to step 307 where a current pattern size "n" is established. The current pattern size is the number of input device events that are to be compared to other input device events. In one embodiment, the pattern size is initially set to the largest possible pattern size from which a comparison may be made. The current pattern size changes during method 300 therefore, the current pattern size n is equal to one-half the queue size less the queue position, expressed as n=(QS−i)/2. For example, where i=0 in a 16 input device event macro comparison queue 206, the current pattern size n=8. Thus, eight input device events are compared to the remaining eight input device events.

In step 308, the auto-macro program 140 queries whether the current pattern size n is greater or equal to the smallest current pattern size, i.e., n≧SP. The auto-macro program 140 performs step 308 to ensure that the current pattern size is not less than the system defined smallest pattern size SP. In this first instance, the pointer is set at the first position (i=0) in the macro comparison queue 206 and the smallest pattern is two (SP=2). Using the above example, two is less than eight (8≧2). Therefore, the auto-macro program 140 has at least two input device events to perform a comparison, and the method 300 proceeds to step 310.

In step 310, the comparison between the sequences of input device events is performed as defined by the parameters set forth in steps 305 through 307. Specifically, a query is performed to determine if the compared input device events exhibit a common pattern. In the embodiment discussed in step 307, the auto-macro program 140 performs a comparison between the first 8 input device events (0–7) and the second 8 input device events (8–15). If the comparison performed in step 310 detects a pattern, then the method 300 proceeds to step 312 where the pattern is stored in the temporary buffer 207.

The pattern that is found during the comparison step of 310, may illustratively be an exact match between the first 8 input events and the second 8 input events such as the following 8 input events (sequentially typed twice) on a keyboard: ALT N, 1246, ALT P, Abcd, 1285, TAB, 2001, ALT M. Alternatively, the pattern may be a progressive pattern such as 7 TAB 35, 9 TAB 40, 11 TAB 45, and so forth.

In other embodiments, the auto-macro program 140 may utilize additional counters, buffers, and other comparative hardware (not shown) to run other subroutines to establish additional patterns that may exist in the sequence of input device events stored in the macro comparison queue 206. In particular, the counters, buffers, and other comparative hardware trace each byte within each input device event to detect additional patterns as between one sequence of input events and another sequence of input events. Each byte within each input device event may represent either a portion or the entire input device event. For example, the string of keystrokes 7 TAB 35 may comprise 3 or more bytes to signify the one input device event. Additionally, the auto-macro program 140 is capable of filtering comparisons between input device events that are deemed trivial. For instance, typing a letter, e.g., "J" repetitively would be ignored by the auto-macro program 140.

Once the pattern is stored in the buffer in step 312, the method 300 may perform a filtering procedure in steps 314 and 316, as shown in phantom. In step 314, the method of the auto-macro program 140 counts the number of times the pattern is repeated. In step 316, a query is performed to determine if a minimal pattern threshold value has been exceeded. The minimal pattern threshold value is configurable and is used to further eliminate infrequent patterns. If, in step 316, the number of times the pattern has been repeated is greater than the minimal pattern threshold value, then in step 318, the method 300 notifies the user that a macro shortcut is available for use. If, in step 316, the minimal pattern threshold value is not exceeded, then the user is not notified. In either case, the method 300 then returns to step 306, and the method 300 is repeated.

Notification to the user at step 318 may be performed by any technique that allows the user to implement the macro once it has been established. Such techniques may include, but are not limited to, a graphical user interface (GUI) window, sounds, flashing icon, or the like. Once the user receives the macro notification, the user may choose to utilize or ignore the macro. Implementing the macro is dependent upon the application program 130 that the user is currently utilizing. For example, if the application program 130 is a word processing program, then illustratively pressing a predefined function key or typing the ALT and M keys simultaneously will initiate the macro.

Figure 3B:
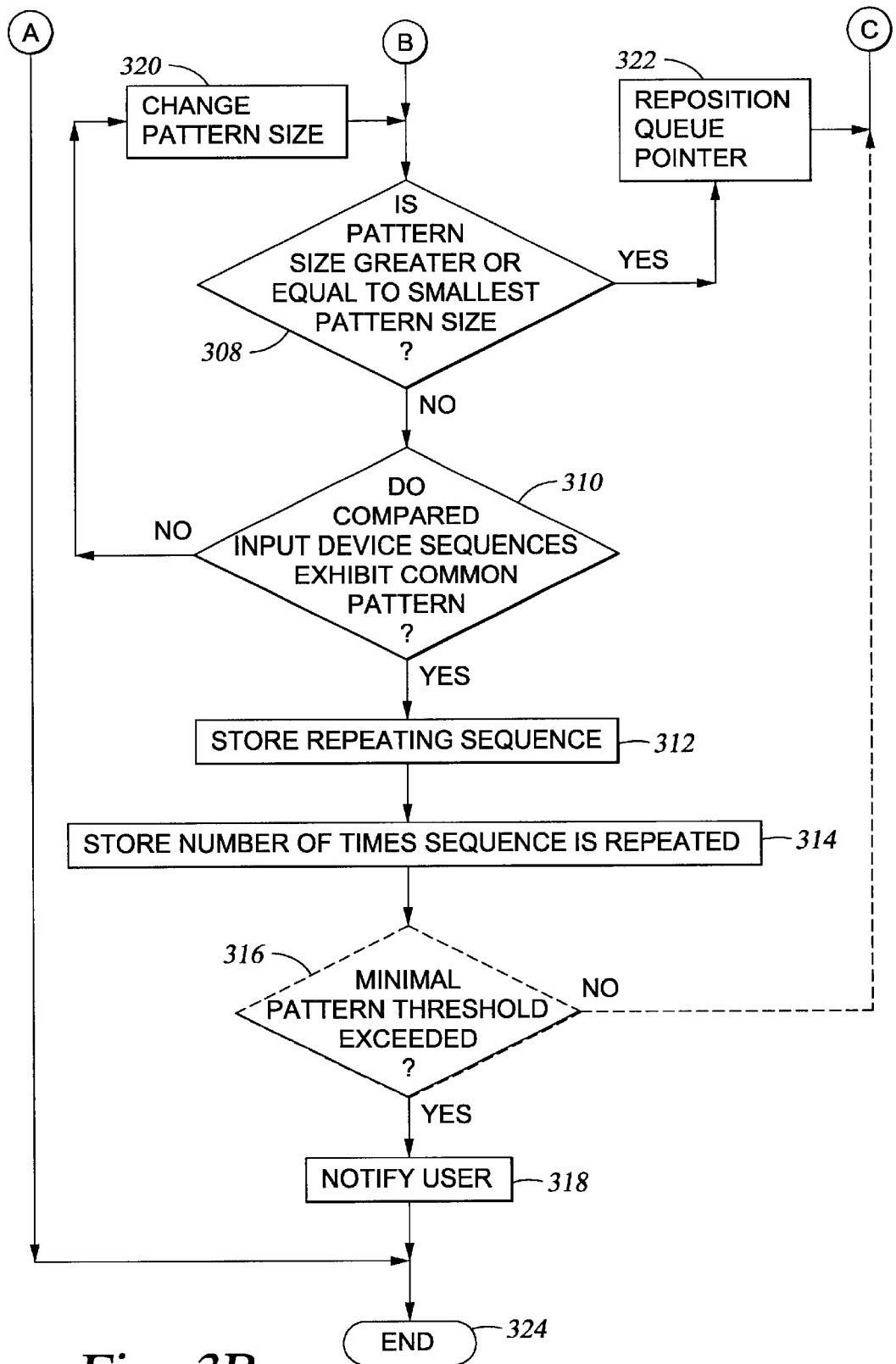
FIG. 3 is represented by FIGS. 3A and B, which together depict a flow diagram of a method to practice the present invention.

Referring back to comparison step 310 in FIG. 3B, if the comparison between the first n input device events and the second n input device events does not detect a pattern, then the method 300 proceeds to step 320. In step 320, the current pattern size "n" is changed. In the preferred embodiment, the current pattern size n is decreased, such that the new pattern size $n_N$=n−1. The pattern size n is decreased for purposes of searching for smaller sized patterns within the macro event queue 206. In the above example, the current pattern size n=8. Now, in step 320, the current pattern size n is reduced by 1, such that the new pattern size $n_N$ equals 7. Accordingly, the new pattern size $n_N$ now becomes the current pattern size n, where $n_N$=n for subsequent computations. The method 300 then proceeds to step 308 and checks that the new, i.e., current pattern size n, is still greater or equal to the smallest pattern (SP) size. Since, in step 308, the current pattern size n=7 is greater or equal to the smallest pattern size of 2, the method 300 proceeds to step 310 where a comparison is made between the first 7 input device events in macro comparison queue positions 0–6, and the second 7 input device events in macro comparison queue positions 7–13.

If, in step 310, a pattern is detected, then the method 300 proceeds through steps 312 through 318 as discussed above. In particular, a minimal pattern threshold value must be exceeded before the user is notified of availability of a macro. If, in step 310, the comparison between the first 7 input device events and second 7 input device events does not reveal a pattern, then the method 300 proceeds to step 320 and the current pattern size is again reduced by a factor of 1.

The method 300 continues in this manner until in step 308, the pattern size is not greater or equal to the smallest pattern, i.e., n<SP. Where SP was predefined as 2, then the pattern size n may not go below such value. In an instance where, in step 308, the current pattern size n is less than the smallest pattern SP, the method 300 proceeds to step 322.

In step 322, the position pointer in the macro comparison queue 206 is changed to a new position. The pointer is repositioned to allow the auto-macro program 140 to search for more patterns, where each position in the queue 206 serves as a new starting point. In the preferred embodiment, the position pointer in the macro comparison queue 206 is set to the next position, that is $i_{new}$=i+1. The method 300 then proceeds to step 306 and continues as discussed above.

In step 306, a query is performed to determine if the position within the queue to compare is less than the queue size QS less the smallest pattern SP. Since in step 306, 1 is less than 14, the method 300 proceeds to step 307 where the latest current pattern size is again computed from the equation n=(QS−i)/2. In this instance, n=(16−1)/2=7.5, which is truncated to the integer 7. In step 308, the current pattern size 7, is computed as being greater than the smallest pattern size 2, and the method 300 proceeds to step 310. In step 310, a comparison is performed between the first 7 input device events and the second 7 input device events. Specifically, the input device events stored in macro comparison queue positions 1 to 7 are compared to the queue positions 8 to 15. The method 300 then proceeds through steps 312 to 320 as discussed previously. In step 322, the position pointer within the macro comparison queue 206 is increased by one position.

Accordingly, for the embodiment discussed herein, when i=0, n equals 8; i=1, n equals 7; i=2, n equals 7; i=3, n equals 6; i=4, n equals 6; i=5, n equals 5; i=6, n equals 5; i=7, n equals 4; i=8, n equals 4; i=9, n equals 3; i=10, n equals 3; i=11, n equals 2; and for i=12, n equals 2. Moreover, as the current pattern size (n) decreases in size, the subroutines that detect progressive patterns become more aggressive. Illustratively, when n=4, the method 300 in step 310 is now able to compare four sequences of input device events. As such, patterns such as 7 TAB 35, 9 TAB 40, 11 TAB 45, and so forth are more apparent for detection by the auto-macro program 140.

When the position pointer "i" in step 306 is greater or equal to the queue size QS less the smallest pattern size SP, the method 300 proceeds to step 324 and ends. Specifically, in the embodiment described herein, the queue size QS less the smallest pattern size SP=14. Therefore, if the pointer position within the macro comparison queue 206 points to the 14$^{TH}$ position or greater, the pattern size n will be less than two. As such, no further comparisons may be performed by the method 300, and the method proceeds to step 324, where the method 300 ends for the specific set of input device events stored in the macro comparison queue 206 during step 304. Method 300 will begin again at step 301 when a new input device event is transferred from the system event queue 124 to the macro comparison queue 206, in accordance with the FIFO technique described above.

The embodiments disclosed herein, set forth a method, apparatus and program that compare sequences of input device events generated by a user to detect patterns between such sequences of input device events. Moreover, once a pattern has been detected, a user is notified that such pattern exists, and such user may optionally select a macro shortcut to input the pattern as the pattern pertains to an applications program the user is actively utilizing. Moreover, multiple macro shortcuts may be created for use in any active application session of a plurality of application program sessions. The patterns may encompass exact matches, progressive patterns, or any other distinct pattern detected in the sequences of input device events.

Although several preferred embodiments that incorporate the teachings of the present invention have been shown and described in detail, those skilled in the art can readily devise many other varied embodiments that still incorporate these teachings.

What is claimed is:

1. A method for automatic recognition and playback of repetitive input device patterns in a computer system, comprising:
receiving a plurality of input device events during an application program session;
determining whether one or more of the plurality of input device events exhibit one or more repetitive patterns; wherein determining comprises:
storing in sequence, the plurality of input device events in a comparison queue having a queue size;
setting a queue position in the comparison queue to define a beginning for a first portion of the plurality of the input device events;
setting a pattern size representing the first portion and at least a second portions of the plurality of input device events to compare; and
comparing the first portion of the plurality of the input device events to at least the second portion of the plurality of the input device events; and
if one or more of the plurality of input device events exhibit one or more repetitive patterns, generating one or more macros for utilizing the repetitive input device patterns.

2. The method of claim 1, further comprising the step of associating the repetitive input device pattern with the application program session, in an instance where the user selects one of the one or more macros.

3. The method of claim 2, further comprising the steps of:
setting the queue position in the comparison queue, where such queue position is less than a difference between the queue size less a smallest pattern size that is used to compare between the first portion and at least the second portion of the plurality of input device events.

4. The method of claim 3, wherein setting the queue position further comprises initially setting a first input device event of the plurality of input device events stored in the comparison queue as the first queue position.

5. The method of claim 2, wherein the setting the pattern size step further comprises the steps of:
computing the pattern size, wherein a current pattern size equals one half of the sum of the queue size less the queue position; and
decreasing the current pattern size during the comparing step until the current pattern size is equal to the smallest pattern size; and
increasing the queue position to the next queue position after decreasing the current pattern size.

6. The method of claim 5, wherein increasing the queue position further comprises the steps of:
increasing the queue position until the queue position exceeds the queue size less the smallest pattern size; and
adding a new input device event to the first position of the comparison queue and removing a last input device event from the comparison queue in an instance where the queue position exceeds the queue size less the smallest pattern size.

7. The method of claim 1, further comprising the steps of:
determining whether the total number of identical repetitive input device patterns exceed a minimal pattern threshold value; and
creating one of the one or more macros in an instance where the minimal pattern threshold value is exceeded.

8. The method of claim 1, wherein the repetitive input device patterns comprises at least one identical pattern.

9. The method of claim 1, wherein the repetitive input device patterns comprises at least one progressive pattern.

10. A computer-readable medium having instructions or program which, when executed by a processor, causes the processor to perform a method for automatic recognition and playback of repetitive input device patterns in a computer system comprising:
receiving a plurality of input device events during an application program session;

determining whether one or more of the plurality of input device events exhibit one or more repetitive patterns; wherein determining comprises:

storing in sequence, the plurality of input device events in a comparison queue having a queue size;

setting a queue position in the comparison queue to define a beginning for a first portion of the plurality of the input device events;

setting a pattern size representing the first portion and at least a second portion of the plurality of input device events to compare; and comparing the first portion of the plurality of the input device events to at least the second portion of the plurality of the input device events; and if one or more of the plurality of input device events exhibit one or more repetitive patterns, generating one or more macros for utilizing the repetitive input device patterns.

11. The computer-readable medium of claim 10, further comprising the step of associating the repetitive input device pattern with the application program session, in an instance where the user selects one of the one or more macros.

12. The computer-readable medium of claim 11, further comprising the steps of:

setting the queue position in the comparison queue, where such queue position is less than a difference between the queue size less a smallest pattern size that is used to compare between the first portion and at least the second portion of the plurality of input device events.

13. The computer-readable medium of claim 12, wherein setting the queue position further comprises initially setting a first input device event of the plurality of input device events stored in the comparison queue as the first queue position.

14. The computer-readable medium of claim 11, wherein the setting the pattern size step further comprises the steps of:

computing the pattern size, wherein a current pattern size equals one half of the sum of the queue size less the queue position; and decreasing the current pattern size during the comparing step until the current pattern size is equal to the smallest pattern size; and increasing the queue position to the next queue position after decreasing the current pattern size.

15. The computer-readable medium of claim 14, wherein increasing the queue position further comprises the steps of:

increasing the queue position until the queue position exceeds the queue size less the smallest pattern size; and adding a new input device event to the first position of the comparison queue and removing a last input device event from the comparison queue in an instance where the queue position exceeds the queue size less the smallest pattern size.

16. The computer-readable medium of claim 10, further comprising the steps of:

determining whether the total number of identical repetitive input device patterns exceed a minimal pattern threshold value; and creating one of the one or more macros in an instance where the minimal pattern threshold value is exceeded.

17. The computer-readable medium of claim 10, wherein the repetitive input device patterns comprises at least one identical pattern.

18. The computer-readable medium of claim 10, wherein the repetitive input device patterns comprises at least one progressive pattern.

19. The computer-readable medium of claim 10, further comprising the step of notifying a user that one of the one or more macros generated is available.

\* \* \* \* \*